(12) United States Patent
Son et al.

(10) Patent No.: US 10,847,765 B2
(45) Date of Patent: Nov. 24, 2020

(54) CELL MODULE ASSEMBLY RECEIVING STRUCTURE HAVING IMPROVED SAFETY

(71) Applicant: LG CHEM, LTD., Seoul (KR)

(72) Inventors: Jeong-Man Son, Daejeon (KR); Kwang-Il Kim, Daejeon (KR); Do-Gyun Kim, Daejeon (KR); Tae-Wook Kim, Daejeon (KR); Jun-Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 57 days.

(21) Appl. No.: 15/766,590

(22) PCT Filed: Feb. 13, 2017

(86) PCT No.: PCT/KR2017/001544
§ 371 (c)(1),
(2) Date: Apr. 6, 2018

(87) PCT Pub. No.: WO2017/138793
PCT Pub. Date: Aug. 17, 2017

(65) Prior Publication Data
US 2018/0287113 A1 Oct. 4, 2018

(30) Foreign Application Priority Data
Feb. 12, 2016 (KR) .......................... 10-2016-0016372

(51) Int. Cl.
*H01M 2/10* (2006.01)
*H01M 2/12* (2006.01)
(Continued)

(52) U.S. Cl.
CPC ....... *H01M 2/1016* (2013.01); *H01M 2/1072* (2013.01); *H01M 2/1094* (2013.01);
(Continued)

(58) Field of Classification Search
None
See application file for complete search history.

(56) References Cited

U.S. PATENT DOCUMENTS

| 7,964,300 B2 * | 6/2011 | Nakazawa | .......... H01M 2/1016 429/53 |
| 2002/0155348 A1 * | 10/2002 | Gitto | .................. H01M 2/0257 429/163 |

(Continued)

FOREIGN PATENT DOCUMENTS

| EP | 1 156 540 A2 | 11/2001 |
| JP | 5088688 B2 | 12/2012 |

(Continued)

OTHER PUBLICATIONS

International Search Report (PCT/ISA/210) issued in PCT/KR2017/001544, dated May 17, 2017.

*Primary Examiner* — Ula C Ruddock
*Assistant Examiner* — Amanda Rosenbaum
(74) *Attorney, Agent, or Firm* — Birch, Stewart, Kolasch & Birch LLP (57) ABSTRACT

The present disclosure discloses a cell module assembly receiving structure including: a cell module assembly comprising a plurality of cells; and a receiving device having an inner space capable of receiving the cell module assembly, wherein the receiving device includes a first partition wall disposed to extend from a first wall in a direction toward a second wall facing the first wall and a second partition wall disposed to extend from the second wall in a direction toward the first wall, wherein a sum of an extension length of the first partition wall and an extension length of the second partition wall is greater than or equal to a distance between the first wall and the second wall.

5 Claims, 5 Drawing Sheets

(51) Int. Cl.
*H01M 2/34* (2006.01)
*H01M 10/052* (2010.01)

(52) U.S. Cl.
CPC ......... *H01M 2/1205* (2013.01); *H01M 2/127* (2013.01); *H01M 2/34* (2013.01); *H01M 10/052* (2013.01)

(56) References Cited

U.S. PATENT DOCUMENTS

| | | | |
|---|---|---|---|
| 2004/0086778 A1* | 5/2004 | Nakano | H01M 2/1252 429/82 |
| 2009/0220851 A1 | 9/2009 | Nakazawa et al. | |
| 2010/0099013 A1* | 4/2010 | Holung | H01M 2/12 429/50 |
| 2014/0322566 A1 | 10/2014 | Kim | |

FOREIGN PATENT DOCUMENTS

| | | | |
|---|---|---|---|
| JP | 2014-33824 A | | 2/2014 |
| JP | 2014-160573 A | | 9/2014 |
| JP | 2014160573 A | * | 9/2014 |
| KR | 10-2007-0045549 A | | 5/2007 |
| KR | 10-2012-0081402 A | | 7/2012 |
| KR | 10-1313396 B1 | | 10/2013 |
| KR | 101313396 B1 | * | 10/2013 |
| KR | 10-1574081 B1 | | 12/2015 |

* cited by examiner

CELL MODULE ASSEMBLY RECEIVING STRUCTURE HAVING IMPROVED SAFETY

TECHNICAL FIELD

The present application claims priority to Korean Patent Application No. 10-2016-0016372 filed on Feb. 12, 2016 in the Republic of Korea, the disclosure of which is incorporated herein by reference.

The present disclosure relates to a cell module assembly receiving structure, and more particularly, to a cell module assembly receiving structure capable of addressing safety issues when flames are generated, due to, for example, an overcharge of the cells.

BACKGROUND ART

A lithium secondary battery is manufactured by combining a plurality of unit cells into one pack and is widely used in applications requiring high energy such as a vehicle battery or an electric power storage device.

However, when a cell module including a plurality of unit cells is overcharged, deformation where cells swell and expand outwardly out of the module may be caused, and in a severe case, a flame is discharged outside the module.

In relation to technology for providing safety of a cell module, Japanese Patent Publication No. 2014-160573 discloses a condenser apparatus having a structure for atomizing a flame, and Japanese Patent Registration No. 5088688 discloses a secondary battery pack having a structure for liquefying a gas generated by thermal runaway.

Japanese Patent Publication No. 2014-160573 discloses a condenser apparatus for atomizing a flame by extending a path length of a flame of an electrolyte solution jetted from a safety valve by installing a partition wall in a recollecting unit so as to prevent fire.

Japanese Patent Registration No. 5088688 discloses a secondary battery pack having a function of liquefying gas generated by thermal runaway, by installing a partition wall in a gas processing unit.

However, according to the conventional art, a technique of immediately preventing discharging of flames to the outside by using a partition wall when safety issues arise in a cell module is not available, and thus, a measure for addressing these issues is needed.

DISCLOSURE

Technical Problem

The present disclosure is designed to solve the problems of the related art, and therefore the present disclosure is directed to providing a cell module assembly receiving structure in which an arrangement of partition walls is improved to prevent discharging of a flame to the outside when issues of safety of cells arise.

Technical Solution

In one aspect of the present disclosure, there is provided a cell module assembly receiving structure including: a cell module assembly comprising a plurality of cells; and a receiving device having an inner space capable of receiving the cell module assembly, wherein the receiving device includes a first partition wall disposed to extend from a first wall in a direction toward a second wall facing the first wall and a second partition wall disposed to extend from the second wall in a direction toward the first wall, wherein a sum of an extension length of the first partition wall and an extension length of the second partition wall is greater than or equal to a distance between the first wall and the second wall.

At least two first partition walls may be arranged side by side, and the second partition wall may be inserted between the first partition walls.

The cell module assembly receiving structure may further include a venting portion formed to be communicatively connected to a space outside the first partition wall and the second partition wall in the receiving device and configured to selectively discharge gaseous byproducts.

The venting portion may have a venting hole capable of communicating with the outside of the receiving device at an internal pressure of 0.5 bar or higher.

The cell module assembly receiving structure may further include a mesh member disposed in the space outside the first partition wall and the second partition wall in the receiving device.

The cell module assembly receiving structure may further include a fire retardant material disposed between the first partition wall and the second partition wall.

Advantageous Effects

According to the present disclosure, if a flame is generated due to an overcharge of a battery module, development of the flame may be directly blocked by a first wall and a second wall to thereby improve safety of a battery pack or a test jig.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
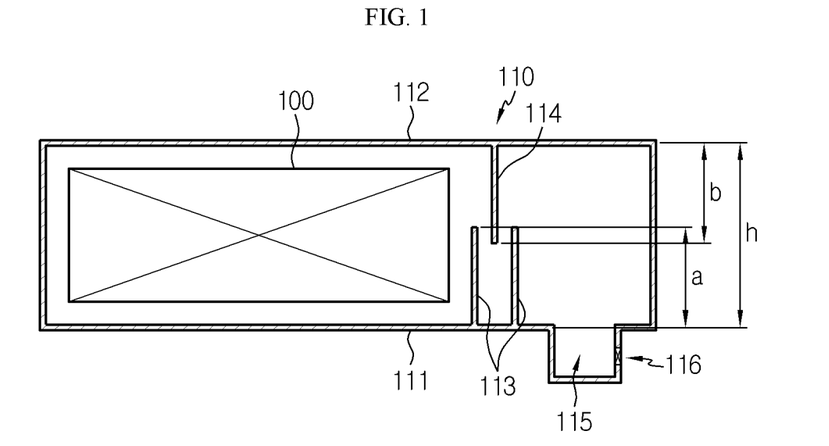
FIG. 1 is a cross-sectional view of a cell module assembly receiving structure according to a preferred embodiment of the present disclosure.

FIG. 1 is a cross-sectional view of a cell module assembly receiving structure according to a preferred embodiment of the present disclosure.

Referring to FIG. 1, the cell module assembly receiving structure according to the preferred embodiment of the present disclosure includes a cell module assembly 100 including a plurality of cells and a receiving device 110 which has an inner space capable of receiving the cell module assembly 100 and in which a first partition wall 113 and a second partition wall 114 are formed within walls.

The cell module assembly 100 is formed by stacking a plurality of cells, for example, in the form of a pouch-type secondary battery.

The receiving device 110 is a structure of a predetermined shape having an inner space capable of receiving the cell module assembly 100.

The receiving device 110 includes a first wall 111 and a second wall 112 disposed to face each other. In addition, a first partition wall 113 and a second partition wall 114 are installed on the first wall 111 and the second wall 112, respectively. Here, while the material of the first partition wall 113 and the second partition wall 114 is not limited, in general, the first partition wall 113 and the second partition wall 114 may preferably be formed of a metal material that is highly resistant to high temperature.

The first partition wall 113 is disposed perpendicularly to an inner surface of the first wall 111 and installed to extend in a direction toward the second wall 112. An extension length (a) of the first partition wall 113 is designed to be smaller than a distance h between the first wall 111 and the second wall 112. Preferably, at least two first partition walls 113 are disposed in parallel to each other at a set distance. The first partition wall 113 may be integrally connected to the first wall 111, or may alternately be detachably connected to the first wall 111.

The second partition wall 114 is disposed perpendicularly to an inner surface of the second wall 112 and installed to extend in a direction toward the first wall 111. Like the first partition wall 113, an extension length (b) of the second partition wall 114 is also designed to be smaller than the distance h between the first wall 111 and the second wall 112.

The second partition wall 114 may be integrally connected to the second wall 112, or may be detachably connected to the second wall 112.

Figure 2:
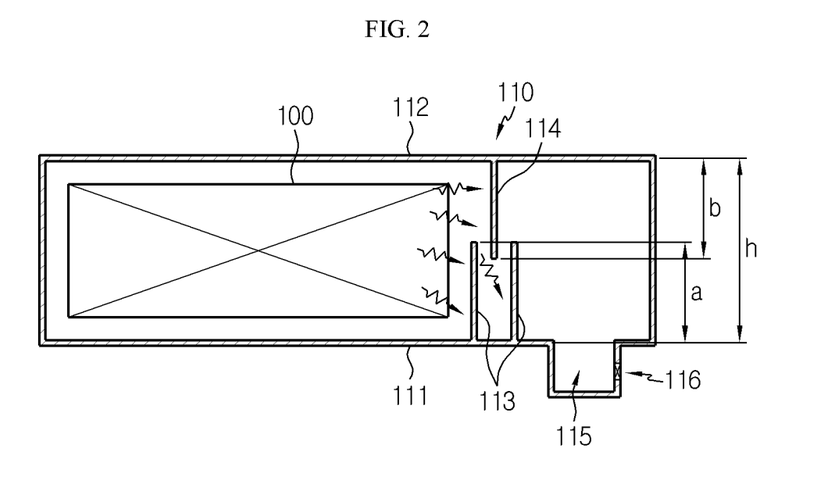
FIG. 2 is a cross-sectional view illustrating a state where flames are blocked by a partition wall in a cell module assembly in FIG. 1.

The first partition wall 113 and the second partition wall 114 are disposed to extend in a direction across a direction in which flames are generated and developed in the cell module assembly 100.

Sizes of the first partition wall 113 and the second partition wall 114 are to be set to satisfy the formula $a+b \geq h$. That is, a sum of the extension length (a) of the first partition wall 113 and the extension length (b) of the second partition wall 114 is set to be greater than or equal to the distance h between the first wall 111 and the second wall 112. In order to effectively prevent discharging of flames, the first partition wall 113 and the second partition wall 114 may are arranged in a zigzag manner so that they are not placed colinearly, and preferably, have a structure in which the second partition wall 114 is partially inserted between two first partition walls 113.

A venting portion 116 providing a venting function may be provided at a side of the receiving device 110. The venting portion 116 includes a venting hole that is selectively opened at a predetermined pressure or higher. The venting portion 116 may preferably be communicatively configured to an outer portion of the receiving device 110 at an internal pressure of 0.5 bar or higher via a predetermined valve installed in the venting hole.

An inner space 115 of the venting portion 116 is communicatively connected to space outside the first partition wall 113 and the second partition wall 114 with respect to an inner portion of the receiving device 110. In order to more securely prevent discharging of flames to the outside, the inner space 115 of the venting portion 116 may preferably be surrounded by walls protruding outwardly from the first wall 111.

Figure 3:
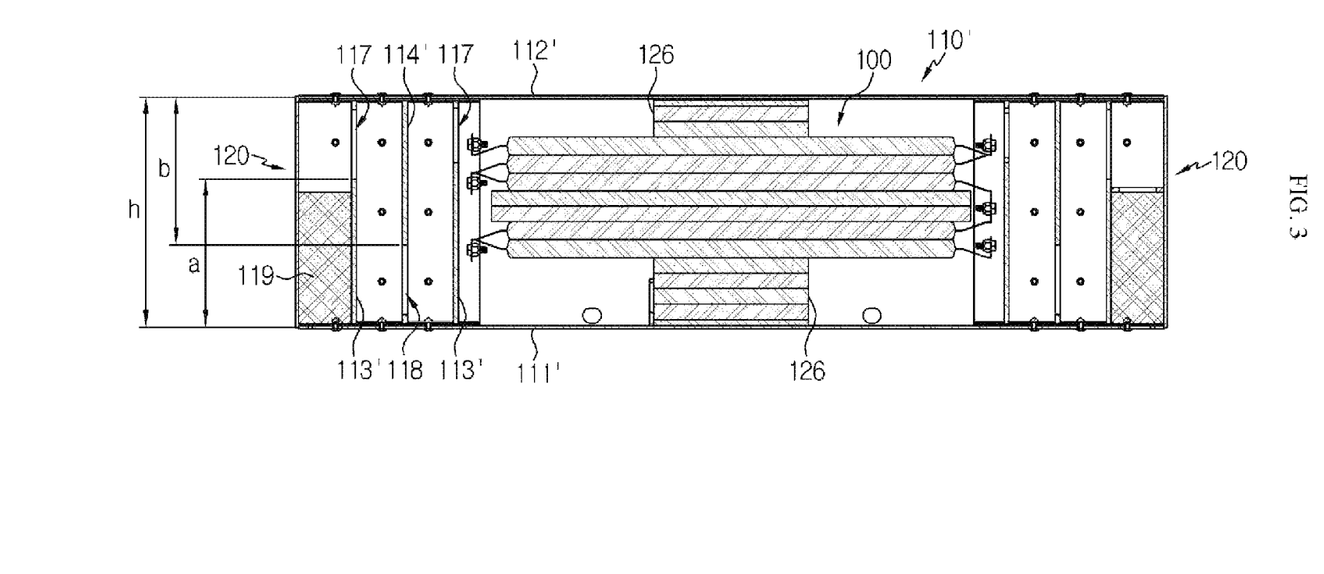
FIG. 3 is a cross-sectional view illustrating a cell module assembly receiving structure according to another embodiment of the present disclosure.
Figure 4:
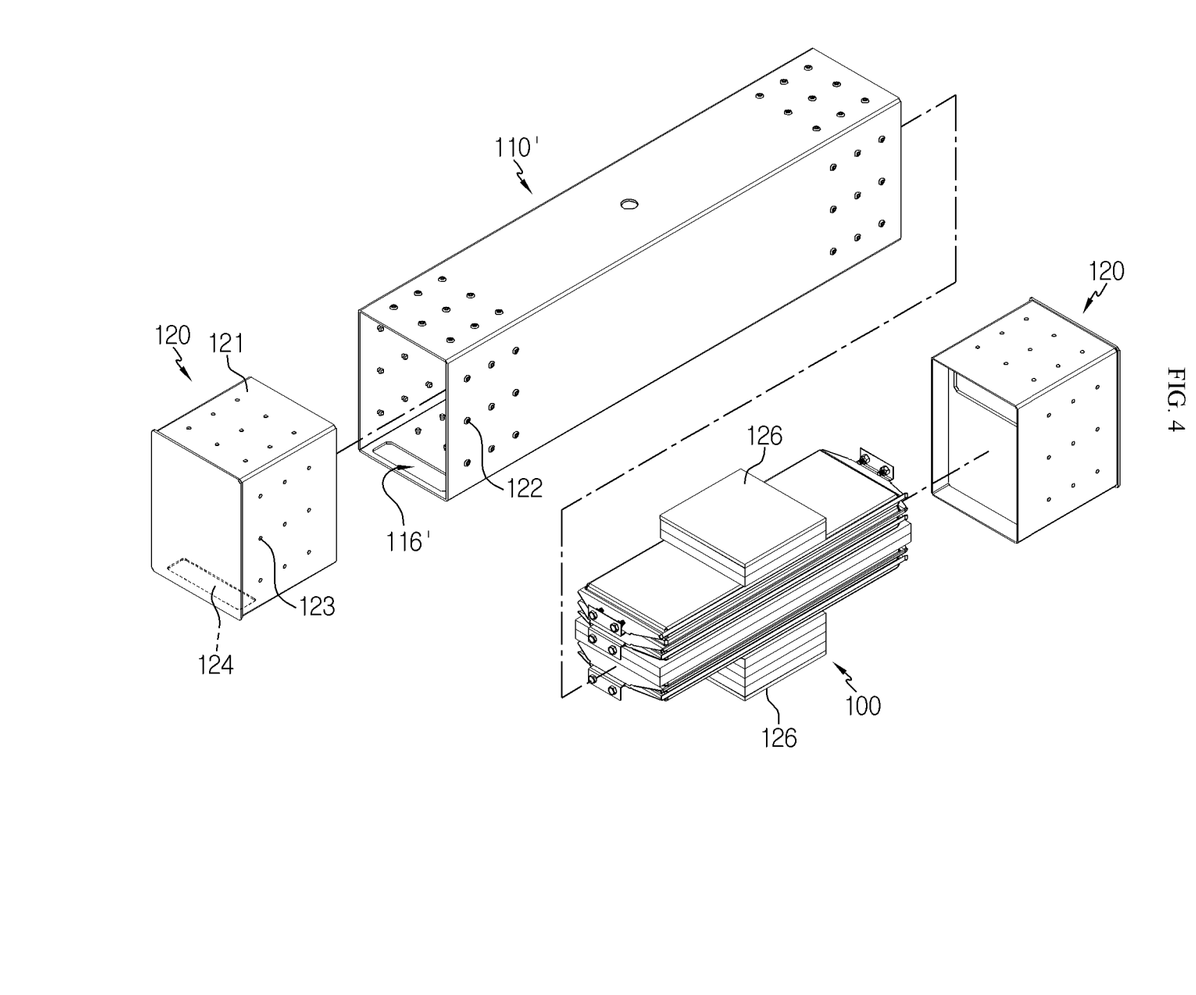
FIG. 4 is an exploded perspective view of FIG. 3.

FIG. 3 is a cross-sectional view illustrating a cell module assembly receiving structure according to another embodiment of the present disclosure. FIG. 4 is an exploded perspective view of FIG. 3.

Referring to FIGS. 3 and 4, the cell module assembly receiving module according to the other embodiment of the present disclosure includes a cell module assembly 100 including a plurality of cells, a receiving device 110' having an inner space capable of receiving the cell module assembly 100, and a partition wall assembly 120 coupled to two ends of the receiving device 110'.

The cell module assembly 100 is formed by stacking a plurality of cells, for example, in the form of a pouch-type secondary battery.

The receiving device 110' is a structure having an internal space capable of receiving the cell module assembly 100, and may preferably be formed of a square-shape metal pipe.

The receiving device 110' includes a first wall 111' and a second wall 112' facing each other.

The partition wall assembly 120 is assembled to the receiving device 110 by being inserted into two ends of the receiving device 110 and fixed thereto by using a predetermined coupling means. To this end, a plurality of rivets 122 and a plurality of coupling holes 123 corresponding to the rivets 122, which are the coupling means, are formed around the two ends of the receiving device 110 and in a housing 121 of the partition wall assembly 120 corresponding to the two ends of the receiving device 110'.

In the housing 121 of the partition wall assembly 120, the first wall 111' and the second wall 112' are arranged in multiple stages at preset distances. Like the above-described embodiment, in order to more effectively prevent discharging of flames, the first partition wall 113' and the second partition wall 114' are arranged in a zigzag manner so that they are not placed colinearly. In addition, as illustrated in FIG. 3, the first partition wall 113' and the second partition wall 114' are arranged alternately with respect to each other and such that one second partition wall 114' is inserted between two first partition walls 113'. While the material of the first partition wall 113' and the second partition wall 114' is not limited, in general, they may preferably be formed of a metal material that is highly resistant to high temperature.

Figure 5:
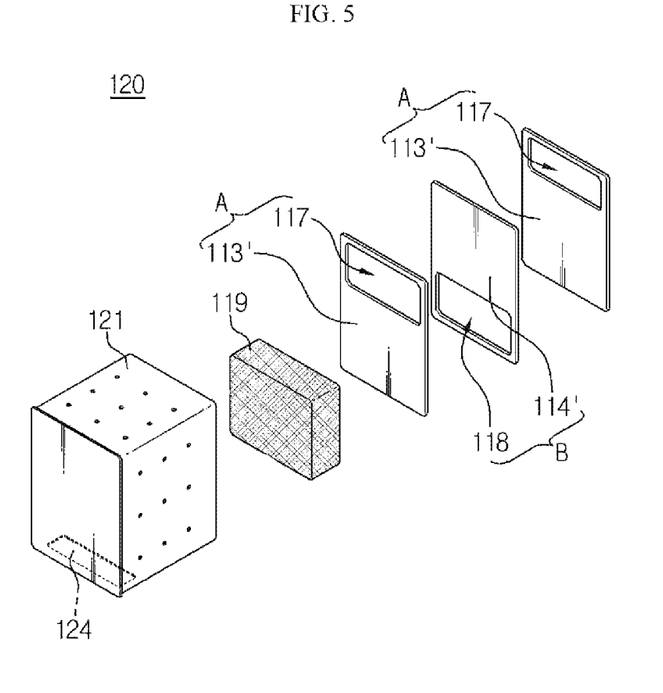
FIG. 5 is a perspective view illustrating an internal structure of a partition wall assembly in FIG. 3.

While the partition wall assembly 120 is assembled in the receiving device 110', the first partition wall 113' is disposed substantially perpendicularly to the first wall 111', and the second partition wall 114 is disposed substantially perpendicularly to the second wall 112'. An extension length (a) of the first partition wall 113' is designed to be smaller than a distance h between the first wall 111' and the second wall 112', and a first transmission window 117 for discharging the air is disposed in a portion corresponding to the length difference. As illustrated in FIG. 5, a first partition wall plate A is formed by combination of the first partition wall 113' and the first transmission window 117. Likewise, an extension length (b) of the second partition wall 114' is designed to be smaller than the distance h between the first wall 111' and the second wall 112', and a second transmission window 118 for discharging the air is disposed in a portion corresponding to the length difference. A second partition wall plate B is formed by combination of the second partition wall 114' and the second transmission window 118. The first partition wall plate A and the second partition wall plate B may be detachably assembled into the partition wall assembly 120, and are thus easy to maintain and repair.

Like the above-described embodiment, the first partition wall 113' and the second partition wall 114' are disposed to extend in a direction across a direction in which flames are generated and developed in the cell module assembly 100. In addition, sizes of the first partition wall 113' and the second partition wall 114' are to be set to satisfy the formula a+b≥h. That is, a sum of the extension length (a) of the first partition wall 113' and the extension length (b) of the second partition wall 114' is set to be greater than or equal to the distance h between the first wall 111' and the second wall 112'.

In the partition wall assembly 120, a mesh member 119 is installed in a space outside the first partition wall 113' and the second partition wall 114' to thereby effectively prevent discharging of flames. The mesh member 119 may be formed of a material such as a metal thread and in a mesh structure, and has an overall hexahedral shape.

A venting hole 124 that is communicatively connectable to a long-hole shaped venting portion 116' formed in the receiving device 110' is formed near an edge end of the partition wall assembly 120, and the mesh member 119 is disposed in a portion corresponding to the venting hole 124.

Figure 6:
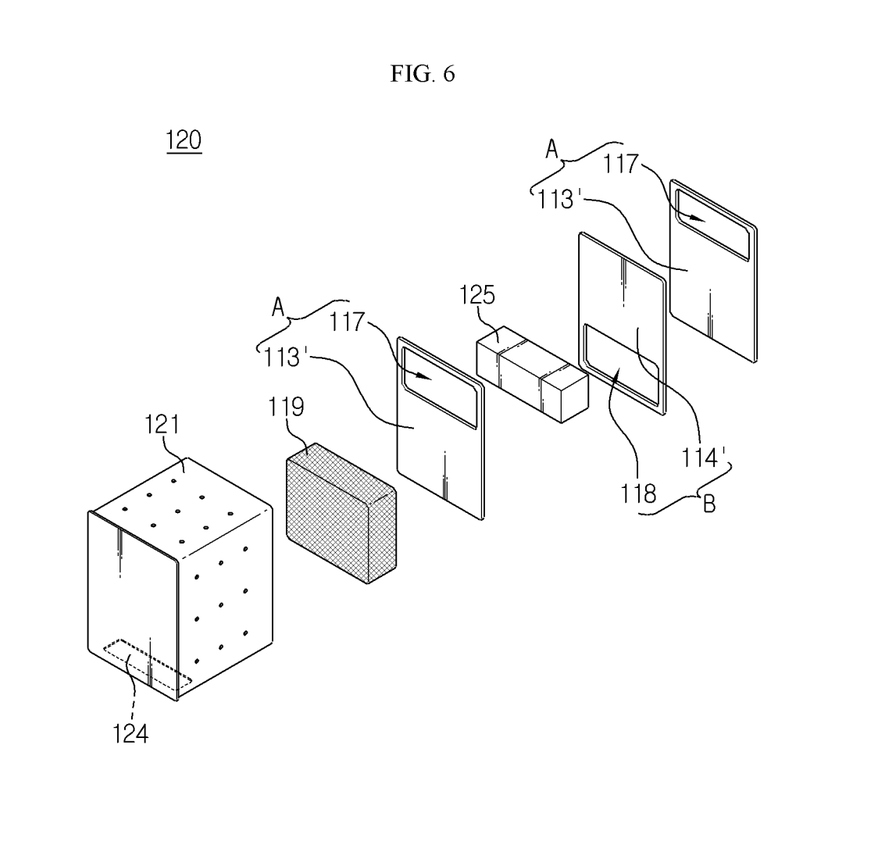
FIG. 6 is an exploded perspective view illustrating a modified example of FIG. 4.

As illustrated in FIG. 6, a fire retardant material 125 in a plate shape or a block shape is added between the first partition wall 113' and the second partition wall 114' to thereby more effectively prevent discharging of flames. In this regard, a fire retardant material 126 may preferably be interposed also between two surfaces of the cell module assembly 100 in a thickness direction and the receiving device 110'. The fire retardant material 125 may be formed of various materials well-known in the art, such as fire-retardant plastic.

According to the cell module assembly receiving structure according to the preferred embodiment of the present disclosure having the above-described configuration, when flames are generated in the cell module assembly 100 due to, for example, overcharging of a cell module, progression of flames out of the receiving device 110, 110' may be fundamentally blocked based on the structure in which the first partition wall 113, 113' and the second partition wall 114, 114' are arranged in a zigzag manner with respect to each other. This flame blocking function may be further enhanced by adding the mesh member 119 and the fire retardant materials 125 and 126.

In addition, other gaseous byproducts besides flames generated in the cell module assembly 100 may be easily discharged to the outside through the venting portions 116, 116' provided in the receiving device 110, 110'.

Experimental Example

Five 49 Ah pouch-type cells having a state of charge (SOC) of 100% were serially connected to configure a cell module assembly and placed in the receiving device 110, 110', and overcharged until cells reached 6.5V at 1 C.

In a test of passing a nail through conducted in the above condition, only smoke was emitted outside the receiving device 110.

Comparative Example

Five 49 Ah pouch-type cells having a SOC of 100% were serially connected to configure a cell module assembly and overcharged until unit cells reached 6.5V at 1 C without any additional structure.

In a test of passing a nail through conducted in the above condition, a flame was generated in the cell module.

As described above, when the present disclosure is applied to a secondary battery pack or a test jig, even when problems such as overcharging occur in the cell module assembly 100, flames are blocked through the first partition walls 113,113' and the second partition walls 114,114' in the receiving device 110,110' and only gaseous byproducts are discharged to the outside, and thus, safety accidents such as fire may be prevented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

According to the present disclosure, when a flame is generated in a cell module due to, for example, overcharging, progression of the flame is blocked through an arrangement of the first partition walls and the second partition walls, and thus, safety of a battery pack or a test jig may be improved.

What is claimed is:

1. A cell module assembly receiving structure comprising:
 a cell module assembly comprising a plurality of cells; and
 a receiving device having an inner space formed between a first side wall and a second side wall facing the first side wall,
 wherein the receiving device includes:
 a first partition wall having a first end attached to the first side wall and extending in a direction toward the second side wall and a second end spaced from the second side wall;
 a second partition wall having a first end attached to the second side wall and extending in a direction toward the first side wall, and a second end spaced from the first side wall; and
 a vent formed to communicate with a space outside the first partition wall and the second partition wall in the receiving device and configured to selectively discharge gaseous byproducts; and
 a mesh member disposed in a portion corresponding to a venting hole of the vent,
 wherein an extension length of the first partition wall is less than a distance between the first side wall and the second side wall and an extension length of the second partition wall is less than the distance between the first side wall and the second side wall,
 wherein a sum of the extension length of the first partition wall and the extension length of the second partition wall is greater than or equal to a distance between the first wall and the second wall,
 wherein the first partition wall and second partition wall divide the inner space into a first compartment between the first partition wall and a first end wall and a second compartment between the second partition wall and a second end wall, the cell module assembly housed within the first compartment, and
 wherein the vent is in a third compartment communicating with the second compartment, the third compartment formed by walls outwardly protruding from the first side wall.

2. The cell module assembly receiving structure of claim 1, wherein at least two first partition walls are arranged side by side, and
 the second partition wall is inserted between the first partition walls.

3. The cell module assembly receiving structure of claim 1, wherein the venting hole is selectively opened to communicate with the outside of the receiving device at an internal pressure of 0.5 bar or higher.

4. The cell module assembly receiving structure of claim 1, further comprising a fire retardant material disposed between the first partition wall and the second partition wall.

5. The cell module assembly receiving structure of claim 1, wherein the receiving device includes a top wall and a bottom wall, and wherein the first partition wall and the second partition wall extend between the top wall and the bottom wall.

* * * * *